3,716,348
METHOD OF FORMING ABRASION-RESISTANT SELF-LUBRICATING COATING ON FERROUS METALS AND ALUMINUM AND RESULTING ARTICLES
Garry R. Perkins, 106 Lake Lane, Cary, Ill. 60013
No Drawing. Continuation-in-part of abandoned application Ser. No. 670,439, Sept. 25, 1967. This application June 1, 1970, Ser. No. 42,576
Int. Cl. B44d 1/16, 1/44
U.S. Cl. 29—195                    8 Claims

ABSTRACT OF THE DISCLOSURE

A low friction, abrasion resistant, hard surface, non-stick coating comprising nickel and fluorocarbon material, and method of application of such coating, furnishing coatings useful for friction surfaces such as cylinder and bearing applications, mold coatings, cooking utensils, and corrosion and abrasion resistant coatings for chemical process equipment and the like. The process may be carried out without pressurized, laminating, or other specialized apparatus.

CROSS-REFERENCE TO RELATED APPLICATIONS

This application is a continuation-in-part of my co-pending application Ser. No. 670,439, filed Sept. 25, 1967 and now abandoned.

BACKGROUND OF INVENTION

The desirability of a hard, self-lubricating abrasion-resistant, non-stick and corrosion resistant coating has been long recognized and various coatings have been developed to serve these functions. However, each of the coatings developed possess some, but not all, of the above-listed desired properties. For example, when an extremely hard bearing surface is desired, hardened metal surfaces may be used, but such surfaces have the serious disadvantage of requiring constant lubrication to prevent binding of the working parts.

In molding operations, it is desirable to have release surfaces which are abrasion resistant and durable, but still provide release properties. Teflon has been used for mold surfaces and exhibits good release properties, but the life of such molds have been short due to poor durability. When hardened metals have been used for molds, no release properties are present. These problems have in the past been overcome by using a durable metal mold and hand spraying a release agent onto the mold prior to each operation. However, most release agents have the disadvantage of leaving a residue on the molded product which frequently interferes with later processing, such as painting.

Polyfluorocarbon materials, such as Teflon, have been widely used as coatings for cooking utensils and for chemical process equipment. The Teflon coatings have been quite satisfactory with respect to their non-stick and corrosion resistant properties, but have not been satisfactory from the standpoint of their low resistance to abrasion. Cooking utensils so coated are easily scratched and chemical process equipment easily damaged and short lived due to abrasion.

SUMMARY OF INVENTION

It is an object of this invention to overcome the above-noted disadvantages of coating materials.

It is a further object to provide a coating and a method of application of such coating to result in a hard, abrasion-resistant, low friction, non-stick surface on ferrous metals and aluminum base materials.

It is still another object of this invention to provide a hard self-lubricating coating for wear surfaces such as bearing surfaces, pivot surfaces, cylinders and the like.

It is another object to provide an abrasion resistant, non-stick, release surface for use in coating molds, valves, conveying equipment, cooking utensils, chemical apparatus and the like.

It is a still further object to provide coatings having good heat resistance and affording chemical and environmental resistance for tanks, valves, storage bins, pipes, etc.

It is an object of this invention to provide a method for coating a base article to provide a low friction, abrasion resistant, hard, non-stick surface.

These and other objects which will be apparent from the following description and examples are obtained by the process of my invention.

The coating of my invention is obtained by first applying a nickel coating to the base material which may be a ferrous metal or aluminum. By the term ferrous metal I include alloys containing a major proportion of iron, such as stainless steels. It is preferred to use a ferrous metal base material. The nickel may be in the form of an alloy with minor amounts of other metals. The nickel can be applied by conventional electro-plating techniques or by electroless nickel chemical processes.

It is preferred to use the electroless nickel chemical process for application of the nickel. The electroless nickel chemical process is especially desirable when a nickel-phosphorus alloy (2 to 10% phosphorus) coating is applied by chemical reduction of the nickel ion on a catalytic surface. Standard electroless nickel coating processes, as known in the art, result in coatings wherein the adhesive force of the coating to the base metal exceeds the cohesive force of the coating itself. Further, the electroles nickel process does not build up plating material on edges and may be applied directly to the base material. The electroless nickel has the unusual property of being amorphous or non-crystalline.

Nickel coatings from 0.0001 to 0.005 may be used; however, I prefer to use thicknesses from about 0.0005 to 0.002 inch. Coatings having a thickness in excess of 0.005 inch do not appear to offer any advantages and merely increase the cost of the coated articles.

Following the nickel coating it is preferred to vapor-hone the nickel surface prior to application of the polytetrafluoroethylene, but this step is not essential.

The nickel coating is then covered by a polytetrafluoroethylene coating. For example, one polytetrafluoroethylene resin which is readily available is sold under the trade name Teflon. Any one of several methods of application known to the art may be used. The polytetrafluoroethylene may be applied by spraying with a solvent, by powder (dusting) techniques, by vacuum impregnation, or any other suitable method of applying the polytetrafluoroethylene to a reasonably uniform thickness. Depending upon the specific use of the coated product and the nickel subsurface, it is desired to obtain a polytetrafluoroethylene coating of about 0.0001 to 0.2 inch. The thicker polytetrafluoroethylene coating is used over a coarsely textured surface. For most applications I prefer fluorocarbon coatings of from about 0.0001 to 0.001 inch thick.

Following application of the polytetrafluoroethylene coating, the article is heat treated at a surface temperature of from about 350 to 820° F. for a period of from about 20 minutes to 2 hours. I prefer to use a surface temperature of from about 550 to 750° F. for shorter time intervals. Because of differences in base materials, it is difficult to set up time-temperature relationships. The time factor, although important, it generally is less critical.

This treatment hardens the nickel by converting the electroless nickel structure to a crystalline state and fusing the polytetrafluoroethylene particles. There is also interaction with the surface of the base article and the coating is thus sintered by the heat treatment. The heat treatment of the coating of my invention does not require pressure conditions, but may be carried out at ambient pressures.

I have found that when the base article is a ferrous metal or aluminum that bonding of the nickel-polytetrafluoroethylene coating to the base article is so tight and integrated that the polytetrafluoroethylene coating cannot be peeled from the surface of the base article. It is this property which affords the coating of my invention to be used for many purposes for which polytetrafluoroethylene coatings had not previously been suitable. One of the principal deterrents to the more widespread use of polytetrafluoroethylene coatings has been the lack of adhesion, or the ready peeling, of the polytetrafluoroethylene coating from metals such as ferrous metals, iron, steel and aluminum. A further deterrent to more widespread use of polytetrafluoroethylene coatings has been the softness resulting in easy damaging of the coating. Again, the polytetrafluoroethylene coating applied by my process provides a hard surface coating affording the low coefficient of friction of polytetrafluoroethylene while also providing extreme hardness. The exact mechanisms of the interrelation of the surface of the base article, the first applied nickel coating, and the then applied polytetrafluoroethylene coating followed by heat treatment to provide the coating of my invention is not completely understood. However, such synergistic interrelationship is clearly present in my process since polytetrafluoroethylene coating applied individually to ferrous metals, aluminum and nickel followed by the same heat treatment as called for by the process of my invention does not result in the non-peelable hard surface coating of my invention. Apparently, there is migration on a micro-scale of components of the base article and the combined coatings to provide the interrelated cohesion.

The process of my invention, unlike prior coating processes, does not require elaborate equipment such as is required for heated-pressure bonding. My process may be carried out without any pressurized equipment, the heating of my process may be performed in the open atmosphere.

The process of my invention described above produces a coated article having at least a portion of its surface coated, said coating comprising sintered nickel and polytetrafluoroethylene. The surface obtained by this method has a hardness of about 60 Rockwell C and a very low coefficient of friction. Cylinders which have been coated by this process have been found to run better and to wear in better at higher temperatures, such as in the range of 150° F.

There are many optional steps which might be practiced in this process, such as, the polytetrafluoroethylene can be applied in two layers of differing colors. For example, a first coating of .002 inch applied of one color and the remainder of the coating with another color through which the color of the first coat is not visible. In this manner, wear of the surface may be visually detected before the coating is removed and danger of binding or corrosion is present. The article with a scratched or worn coating may be easily and economically resurfaced by re-application of only the polytetrafluoroethylene coating followed by heat treating.

Coated articles of my invention find use in a wide variety of applications. Our important use is providing superior metallic cooking vessels having a non-stick coated cooking surface. Such surfaces have much greater abrasion resistance than presently used fluorocarbon and silicone surfaces. It is especially suitable to apply the coating of my invention to aluminum cooking vessels. Other important uses for the coatings of my invention are industrial coatings such as for coating molds where high durability and excellent release properties are obtained. Still another important use is for coating bearsurfaces and friction surfaces such as are encountered in every mechanical, pneumatic and hydraulic apparatus. Many other important uses may be found in a wide variety of protective coating such as for chemical process equipment, oven liners, cutting blades, and the like.

The following examples are presented to illustrate the present invention.

EXAMPLE I

Bearing materials shown in Table I were prepared and tested for physical properties. The first five materials listed in Table I are presently used for low-friction coatings such as cylinder liners and were tested by using solid blocks of the material mounted to a backer block. The sixth material was a coating on the backer block of 0.001" electroless nickel (8–10% phosphorus) and 0.002" Teflon S (a stratified fluorocarbon-rich surface coating material sold by DuPont) which had been heat treated at about 750° F. for about 45 minutes to result in the sintered nickel-polytetrafluoroethylene coating of this invention.

The hardness of the surface of the materials was tested by standard techniques and is shown in Table I.

The backer blocks were mounted with the test material against a rotating block of A.I.S.I. S–2 mild tool steel. For a standard test the block was rotated against the test surface without lubricant for one hour. The rotating block exerted a 100–150 pounds per square inch force against the surface of the material tested. Separate tests were conducted at a sliding velocity of 460 and 230 feet per minute. The average coefficient of friction of the test surface was measured before the test and again measured following the one hour test, and the amount of surface wear measured. Such wear and friction tests were conducted in a nitrogen controlled atmosphere at 86° and 160° F. The results are shown in Table I.

TABLE I

| Bearing material | Hardness | Sliding velocity (feet/min.) | Average coefficient of friction (test) | | Wear in 1 hour (millimeters) | |
|---|---|---|---|---|---|---|
| | | | Before | After | 86° F. | 160° F. |
| Nylon | 83 Shore D | 460 | 0.60 | 0.60 | (1) | (1) |
| | | 230 | 0.60 | 0.60 | (1) | (1) |
| Teflon with 20% mica filler | 75 Shore D | 460 | 0.14 | 0.17 | 3.2 | 4.6 |
| | | 230 | 0.11 | 0.17 | 3.0 | 3.6 |
| Teflon with 20% short fiber glass and 5% MoS₂ | 74 Shore D | 460 | 0.03 | .03 | 1.6 | 1.6 |
| | | 230 | 0.04 | .03 | 1.5 | 1.6 |
| Polypropylene | 80 Shore D | 460 | 0.60 | 0.60 | (1) | (1) |
| | | 230 | 0.60 | 0.60 | (1) | (1) |
| 35% Teflon impregnated in carbon | 79 Shore D | 460 | 0.035 | 0.02 | 1.3 | 0.07 |
| | | 230 | 0.03 | 0.02 | 1.0 | 0.09 |
| Sintered nickel and Teflon | 60 Rockwell C | 460 | 0.02 | 0.01 | 0.8 | 0.05 |
| | | 230 | 0.015 | 0.01 | 0.6 | 0.05 |

[1] Failed.

EXAMPLE II

An abrasion test was conducted on the same coating materials used in Example I by coating standard cylinders with the noted material. A 1″ aluminum piston with a Neoprene O ring was fitted tightly within the coated cylinder and operated by air pressure at the rate of 120 strokes per minute. No lubricant was added to the piston-cylinder system. The piston was allowed to operate until it would no longer stroke, and the total number of strokes was observed. The tests were conducted on six cylinders with each coating material and the number of strokes shown in Table II are the extreme ranges.

TABLE II

| Coating material: | Number of strokes before binding |
|---|---|
| Nylon | 2500–2800 |
| Teflon with 20% mica filler | 6200–7300 |
| Teflon with 20% short fiber glass & 5% MoS$_2$ | 5400–6100 |
| Polypropylene | 1200–1700 |
| 35% Teflon impregnated in carbon | 425,000–570,000 |
| Sintered Nickel & Teflon [1] | 1,500,000–3,500,000 |

[1] Known in the trade under the tradename Tufwear registered for abrasion-resistant metallic-fluorocarbon coatings.

The above examples clearly show superiority of the coating of this invention over presently used low-friction coatings in both physical properties and under actual use conditions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerable without departing from the basic principles of the invention.

I claim:

1. A process for coating a base article selected from ferrous metals and aluminum comprising first applying by an electroless nickel chemical plating process a nickel coating about 0.0001 to 0.005 inch thick to said article; then applying over said nickel a polytetrafluoroethylene coating about 0.0001 to 0.2 inch thick; and heat treating and fusing the surface of said base article, nickel and polytetrafluoroethylene at a surface temperature of about 350° to 820° F. for about 20 minutes to 2 hours, to obtain an abrasion resistance self-lubricating surface.

2. The process of claim 1 wherein said nickel coating is about 0.0005 to 0.002 inch thick and said polytetrafluoroethylene coating is about 0.0001 to 0.001 inch thick.

3. The process of claim 1 wherein said base article is aluminum.

4. The process of claim 1 wherein said base article is ferrous metal.

5. The process of claim 1 wherein said temperature is about 550° to 750° F.

6. An article comprising a structure having thereon a coating obtained by the process of claim 1.

7. The process for coating a base article selected from ferrous metals and aluminum comprising first applying by an electro nickel plating process a nickel coating about 0.0001 to 0.005 inch thick to said article; then applying over said nickel a polytetrafluoroethylene coating about 0.0001 to 0.2 inch thick; and heat treating and fusing said nickel and polytetrafluoroethylene coating at a surface temperature of about 350° to 820° F. for about 20 minutes to 2 hours, to obtain an abrasion resistant self-lubricating surface.

8. A process for coating a base article selected from ferrous metals and aluminum comprising first applying by an electroless chemical plating process a coating consisting essentially of nickel and about 2 to 10 wt. percent phosphorus about 0.0001 to 0.005 inch thick to said article; then applying over said nickel-phosphorus a polytetrafluoroethylene coating about 0.0001 to 0.2 inch thick; and heat treating and fusing the surface of said base article, nickel and polytetrafluoroethylene at a surface temperature of about 350° to 820° F. for about 20 minutes to 2 hours.

References Cited

UNITED STATES PATENTS

| | | | |
|---|---|---|---|
| 3,010,536 | 11/1961 | Plurien et al. | 117—132 CF X |
| 3,136,680 | 6/1964 | Hochberg | 117—75 X |
| 3,211,325 | 10/1965 | Wisnicki | 117—71 M X |
| 3,279,936 | 10/1966 | Forestek | 117—71 M X |
| 3,311,494 | 3/1967 | Reinert et al. | 117—132 CF X |
| 3,345,202 | 10/1967 | Kiss et al. | 117—71 M |
| 3,416,941 | 12/1968 | Mizuno | 117—71 M X |
| 3,421,972 | 1/1969 | Cromwell et al. | 117—75 X |
| 3,451,856 | 6/1969 | Fraase et al. | 204—38 E UX |
| 3,461,044 | 8/1969 | Lyons, Jr. et al. | 204—38 E UX |
| 3,511,690 | 5/1970 | Aharoni | 117—71 M |

ALFRED L. LEAVITT, Primary Examiner

J. R. BATTEN, JR., Assistant Examiner

U.S. Cl. X.R.

29—196.6, 197; 117—71 M, 75; 204—38 E; 220—64